US011962457B2

(12) United States Patent
Lee et al.

(10) Patent No.: US 11,962,457 B2
(45) Date of Patent: Apr. 16, 2024

(54) METHOD OF PERFORMING BEAM MANAGEMENT, AND DEVICE THEREFOR

(71) Applicant: LG ELECTRONICS INC., Seoul (KR)

(72) Inventors: Eunjong Lee, Seoul (KR); Jiwon Kang, Seoul (KR); Sunyoung Lee, Seoul (KR); Jeonggu Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 576 days.

(21) Appl. No.: 17/265,487

(22) PCT Filed: Aug. 9, 2019

(86) PCT No.: PCT/KR2019/010060
§ 371 (c)(1),
(2) Date: Feb. 2, 2021

(87) PCT Pub. No.: WO2020/032674
PCT Pub. Date: Feb. 13, 2020

(65) Prior Publication Data
US 2021/0320838 A1 Oct. 14, 2021

(30) Foreign Application Priority Data
Aug. 10, 2018 (KR) .................. 10-2018-0093738

(51) Int. Cl.
*H04L 41/0654* (2022.01)
*H04L 5/00* (2006.01)
*H04L 41/0677* (2022.01)
*H04W 4/40* (2018.01)
*H04W 74/0833* (2024.01)

(52) U.S. Cl.
CPC ........ *H04L 41/0654* (2013.01); *H04L 5/0048* (2013.01); *H04L 41/0677* (2013.01); *H04W 4/40* (2018.02); *H04W 74/0833* (2013.01)

(58) Field of Classification Search
CPC .............. H04L 41/0654; H04L 5/0048; H04L 41/0677; H04W 4/40; H04W 74/0833; H04W 24/02; H04W 24/08; H04W 76/19; H04W 16/28; H04B 7/0695
See application file for complete search history.

(56) References Cited

U.S. PATENT DOCUMENTS

| | | | |
|---|---|---|---|
| 2019/0080264 A1* | 3/2019 | Wasekura | G06Q 30/0207 |
| 2019/0281480 A1* | 9/2019 | Wei | H04B 7/0617 |
| 2019/0394082 A1* | 12/2019 | Cirik | H04W 24/08 |
| 2021/0153245 A1* | 5/2021 | Tooher | H04W 74/006 |

OTHER PUBLICATIONS

PCT International Application No. PCT/KR2019/010060, International Search Report dated Dec. 4, 2019, 10 pages.
(Continued)

*Primary Examiner* — Kiet Tang
(74) *Attorney, Agent, or Firm* — LEE, HONG, DEGERMAN, KANG & WAIMEY

(57) ABSTRACT

In the present disclosure, a UE restarts a beam failure detection timer without incrementing a beam failure instance counter, when detecting that the network skips transmitting a downlink reference signal (DL RS).

20 Claims, 12 Drawing Sheets

(56) References Cited

OTHER PUBLICATIONS

CMCC, "Consideration of RACH procedure in NR-U system," 3GPP TSG RAN WG2 Meeting #103, R2-1811511, Aug. 2018, 3 pages.
ASUSTeK, "On the validity of BFD counting for BFR procedure," 3GPP TSG-RAN WG2 Meeting #102, R2-1806904, May 2018, 9 pages.
ZTE, "Consideration on channel access procedure for NR-U," 3GPP TSG RAN WG2 NR Meeting #103, R2-1811281, Aug. 2018, 4 pages.
MediaTek, Inc, "Clarifications on Beam Failure Recovery Procedure," 3GPP TSGRAN2#103, R2-1802406, Mar. 2018, 12 pages.
MediaTek Inc, "Summary 2 on Remaining issues on Beam Failure Recovery," 3GPP TSG RAN WG1 Meeting #93, R2-1807796, May 2018, 29 pages.

\* cited by examiner (a) User Plane Protocol Stack (b) Control Plane Protocol Stack

METHOD OF PERFORMING BEAM MANAGEMENT, AND DEVICE THEREFOR

CROSS-REFERENCE TO RELATED APPLICATIONS

This application is the National Stage filing under 35 U.S.C. 371 of International Application No. PCT/KR2019/010060, filed on Aug. 9, 2019, which claims the benefit of earlier filing date and right of priority to Korean Application No. 10-2018-0093738 filed on Aug. 10, 2018, the contents of which is hereby incorporated by reference herein in its entirety.

TECHNICAL FIELD

The present invention relates to a wireless communication system.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information.

DISCLOSURE

Technical Problem

Various types of signals, including data signals and control signals, are communicated via the UL and DL. Scheduling of such communications is typically performed, to achieve improved efficiency, latency, and/or reliability. Overcoming delay or latency has become an important challenge in applications whose performance critically depends on delay/latency.

The technical objects that can be achieved through the present invention are not limited to what has been particularly described hereinabove and other technical objects not described herein will be more clearly understood by persons skilled in the art from the following detailed description.

Technical Solution

As an aspect of the present disclosure, provided herein is a method for performing a beam management by a user equipment (UE) in a wireless communication system. The method comprises: detecting absence of a downlink reference signal (DL RS) in a DL RS resource; (re)starting a beam failure detection (BFD) timer without incrementing the beam failure instance (BFI) counter, when detecting absence of the DL RS.

As another aspect of the present disclosure, provided herein is a device for a user equipment (UE) of performing a beam management in a wireless communication system. The device comprises: at least one processor; and at least one computer memory that is operably connectable to the at least one processor and that has stored thereon instructions which, when executed, cause the at least one processor to perform operations. The operations comprise: detecting absence of a downlink reference signal (DL RS) in a DL RS resource; (re)starting a beam failure detection (BFD) timer without incrementing the beam failure instance (BFI) counter, when detecting absence of the DL RS.

In each aspect of the present disclosure, the method or operations may further comprise: performing a beam failure recovery (BFR) procedure when the BFI counter reaches a first maximum value.

In each aspect of the present disclosure, the method or operations may further comprise: incrementing a no beam instance (NBI) counter by 1, when detecting absence of the DL RS.

In each aspect of the present disclosure, the method or operations may further comprise: resetting the NBI counter to 0, when incrementing the BFI counter.

In each aspect of the present disclosure, the method or operations may further comprise: starting or restarting a no beam detection (NBD) timer, when detecting absence of the DL RS.

In each aspect of the present disclosure, the method or operations may further comprise: resetting the NBI counter to 0 when the NBD timer expires.

In each aspect of the present disclosure, the NBI counter may be incremented while the NBD timer is running.

In each aspect of the present disclosure, the method or operations may further comprise: performing a random access procedure when the NBI counter reaches a second maximum value.

In each aspect of the present disclosure, the method or operations may further comprise: transmitting, via a transceiver of the UE to a base station, information indicating that the DL RS for the UE is continuously absent, when the NBI counter reaches a second maximum value and when the UE has an available UL resource.

In each aspect of the present disclosure, the UE may be an autonomous vehicle that communicates with at least a mobile terminal, a network, and another autonomous vehicle other than the UE.

The above technical solutions are merely some parts of the implementations of the present disclosure and various implementations into which the technical features of the present disclosure are incorporated can be derived and understood by persons skilled in the art from the following detailed description of the present disclosure.

Advantageous Effects

In some scenarios, implementations of the present disclosure may provide one or more of the following advantages. In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

Also, a beam failure recovery procedure can be performed efficiently and timely.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
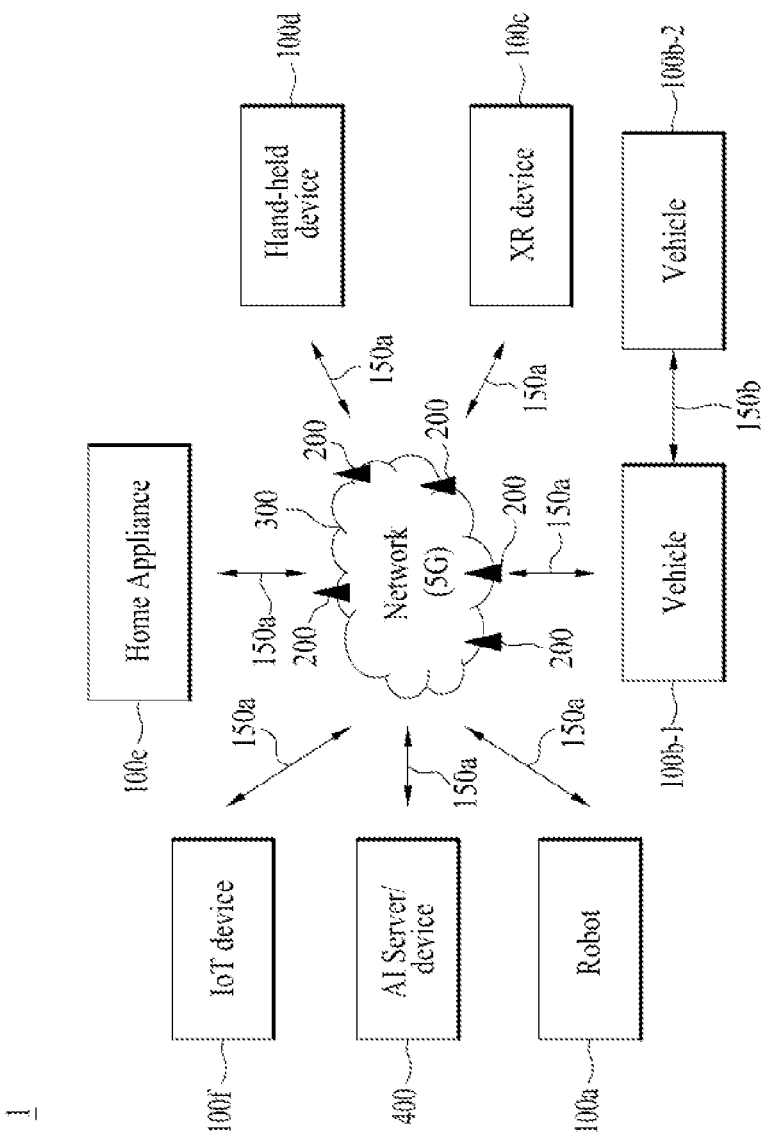
FIG. 1 illustrates an example of a communication system 1 to which implementations of the present disclosure is applied.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced. For example, the following documents may be referenced.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP NR (e.g. 5G)
3GPP TS 38.133: Requirements for support of radio resource management
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description In the present disclosure, a user equipment (UE) may be a fixed or mobile device. Examples of the UE include various devices that transmit and receive user data and/or various kinds of control information to and from a base station (BS). In the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the enhanced packet core (EPC)/long term evolution (LTE) system is referred to as an eNB, and a BS of the new radio (NR) system is referred to as a gNB.

In the present disclosure, a node refers to a point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In the present disclosure, a physical downlink control channel (PDCCH), and a physical downlink shared channel (PDSCH) refer to a set of time-frequency resources or resource elements (REs) carrying downlink control information (DCI), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. In the present disclosure, for dual connectivity (DC) operation, the term "special Cell" refers to the PCell of the master cell group (MCG) or the PSCell of the secondary cell group (SCG), and otherwise the term Special Cell refers to the PCell. An SpCell supports physical uplink control channel (PUCCH) transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with DC. For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells.

The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In DC, two MAC entities are configured in the UE: one for the MCG and one for the SCG. Each MAC entity is configured by RRC with a serving cell supporting PUCCH transmission and contention based Random Access. In the present disclosure, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, monitoring a channel refers to attempting to decode the channel. For example, monitoring a physical downlink control channel (PDCCH) refers to attempting to decode PDCCH(s) (or PDCCH candidates).

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the 5G system.

The BSs and the network may be implemented as wireless devices and a specific wireless device 200a may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RATs (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
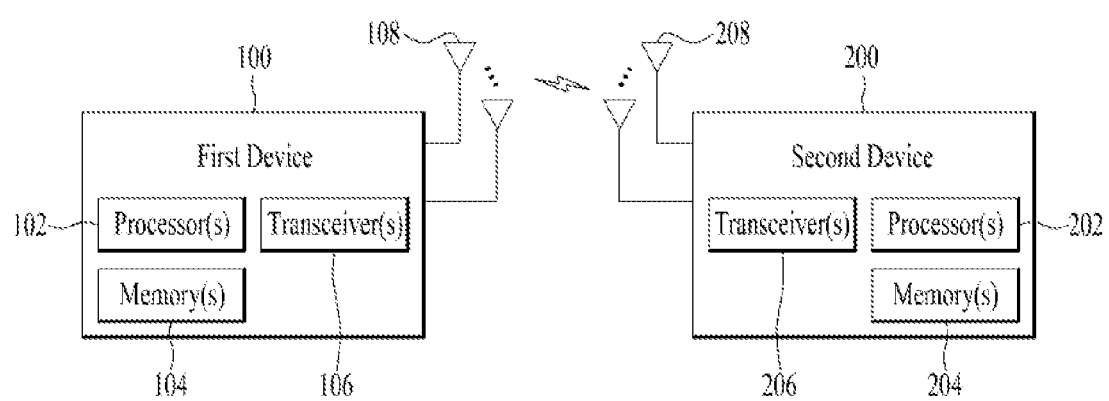
FIG. 2 is a block diagram illustrating examples of communication devices which can perform a method according to the present disclosure.

FIG. 2 is a block diagram illustrating examples of communication devices which can perform a method according to the present disclosure.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to {the wireless device 100a to 100f and the BS 200} and/or {the wireless device 100a to 100f and the wireless device 100a to 100f} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the functions, procedures, and/or methods described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the procedures and/or methods described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the functions, procedures, and/or methods described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the procedures and/or methods described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in the present disclosure may be implemented using firmware or software and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS, unless otherwise mentioned or described. For example, the processor(s) 102 connected to, mounted on or launched in the first wireless device 100 may be configured to perform the UE behaviour according to an implementation of the present disclosure or control the transceiver(s) 106 to perform the UE behaviour according to an implementation of the present disclosure. The processor(s) 202 connected to, mounted on or launched in the second wireless device 200 may be configured to perform the BS behaviour according to an implementation of the present disclosure or control the transceiver(s) 206 to perform the BS behaviour according to an implementation of the present disclosure.

Figure 3:
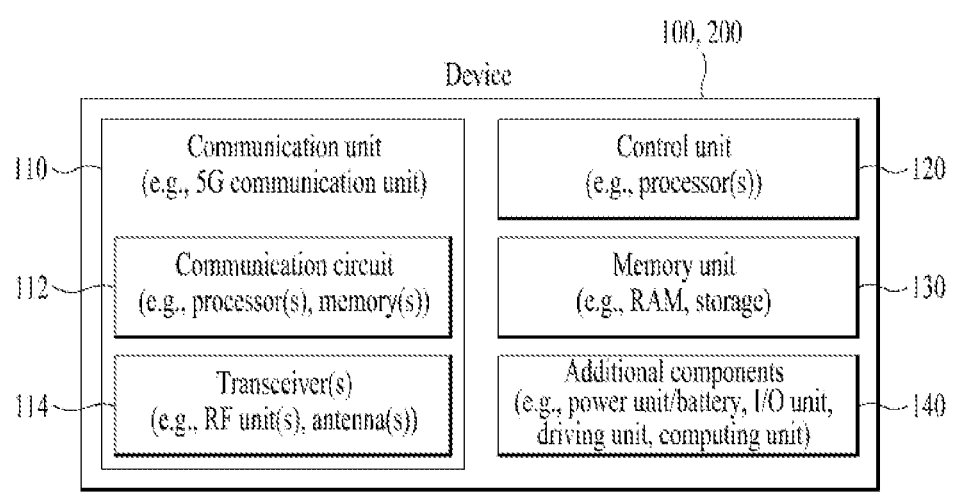
FIG. 3 illustrates another example of a wireless device which can perform implementations of the present invention.

FIG. 3 illustrates another example of a wireless device which can perform implementations of the present invention. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g. audio I/O port, video I/O port), a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a Fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 4:
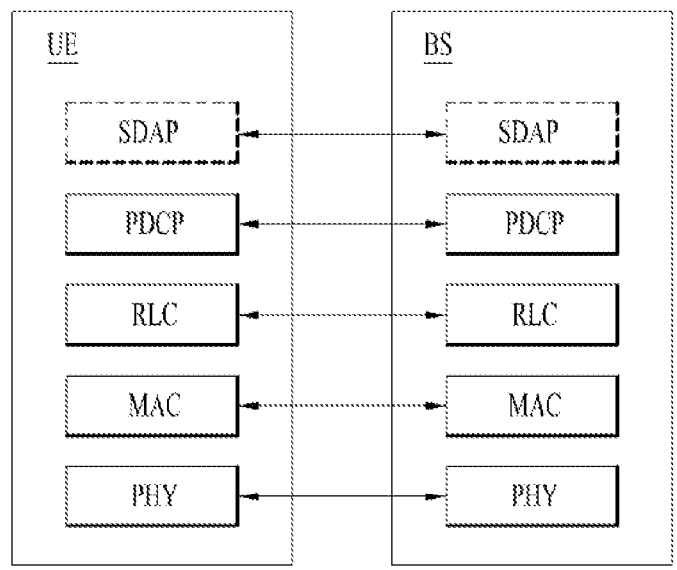
FIG. 4 illustrates an example of protocol stacks in a third generation partnership project (3GPP) based wireless communication system.
Figure 4:
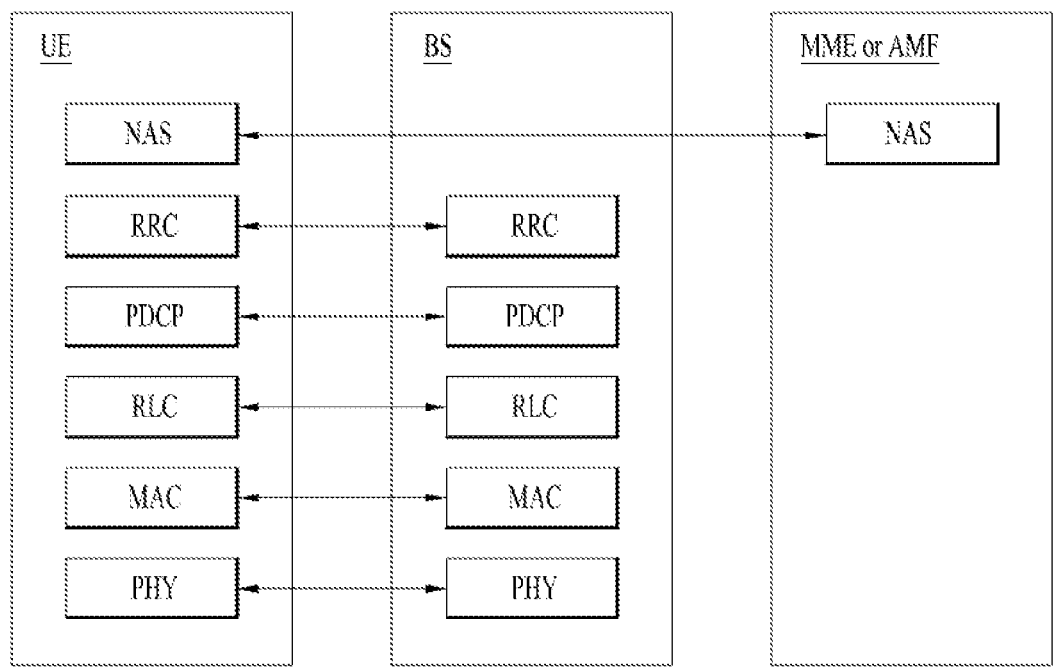

FIG. 4 illustrates an example of protocol stacks in a 3GPP based wireless communication system.

In particular, FIG. 4(a) illustrates an example of a radio interface user plane protocol stack between a UE and a base station (BS) and FIG. 4(b) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4(a), the user plane protocol stack may be divided into a first layer (Layer 1) (i.e., a physical (PHY) layer) and a second layer (Layer 2). Referring to FIG. 4(b), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

The NAS control protocol is terminated in an access management function (AMF) on the network side, and performs functions such as authentication, mobility management, security control and etc.

In the 3GPP LTE system, the layer 2 is split into the following sublayers: medium access control (MAC), radio link control (RLC), and packet data convergence protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network quality of service (QoS) flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G core (5GC) or NG-RAN; establishment, maintenance and release of an RRC connection between the UE and NG-RAN; security functions including key management; establishment, configuration, maintenance and release of signalling radio bearers (SRBs) and data radio bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
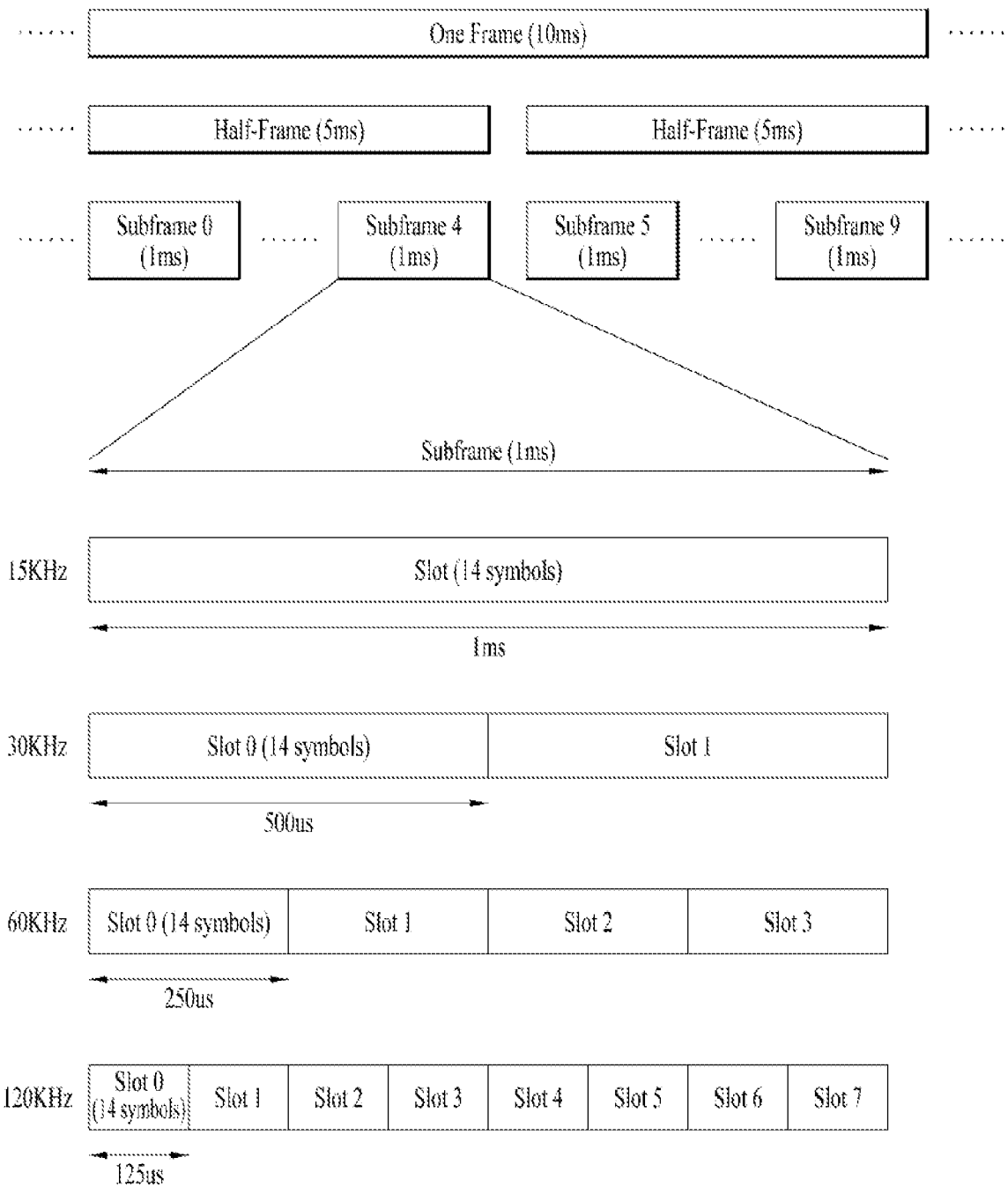
FIG. 5 illustrates an example of a frame structure in a 3GPP based wireless communication system.

FIG. 5 illustrates an example of a frame structure in a 3GPP based wireless communication system.

The frame structure illustrated in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz. The following table shows the number of OFDM symbols per slot, the number of slots per frame, and the number of slots per for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks in the resource grid and the subscript x is DL for downlink and UL for uplink. $N^{RB}_{sc}$ is the number of subcarriers per resource blocks. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index representing a symbol location relative to a reference point in the time domain. In the 3GPP based wireless communication system, a resource block is defined by 12 consecutive subcarriers in the frequency domain.

In the 3GPP NR system, resource blocks are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive resource blocks. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

Figure 6:
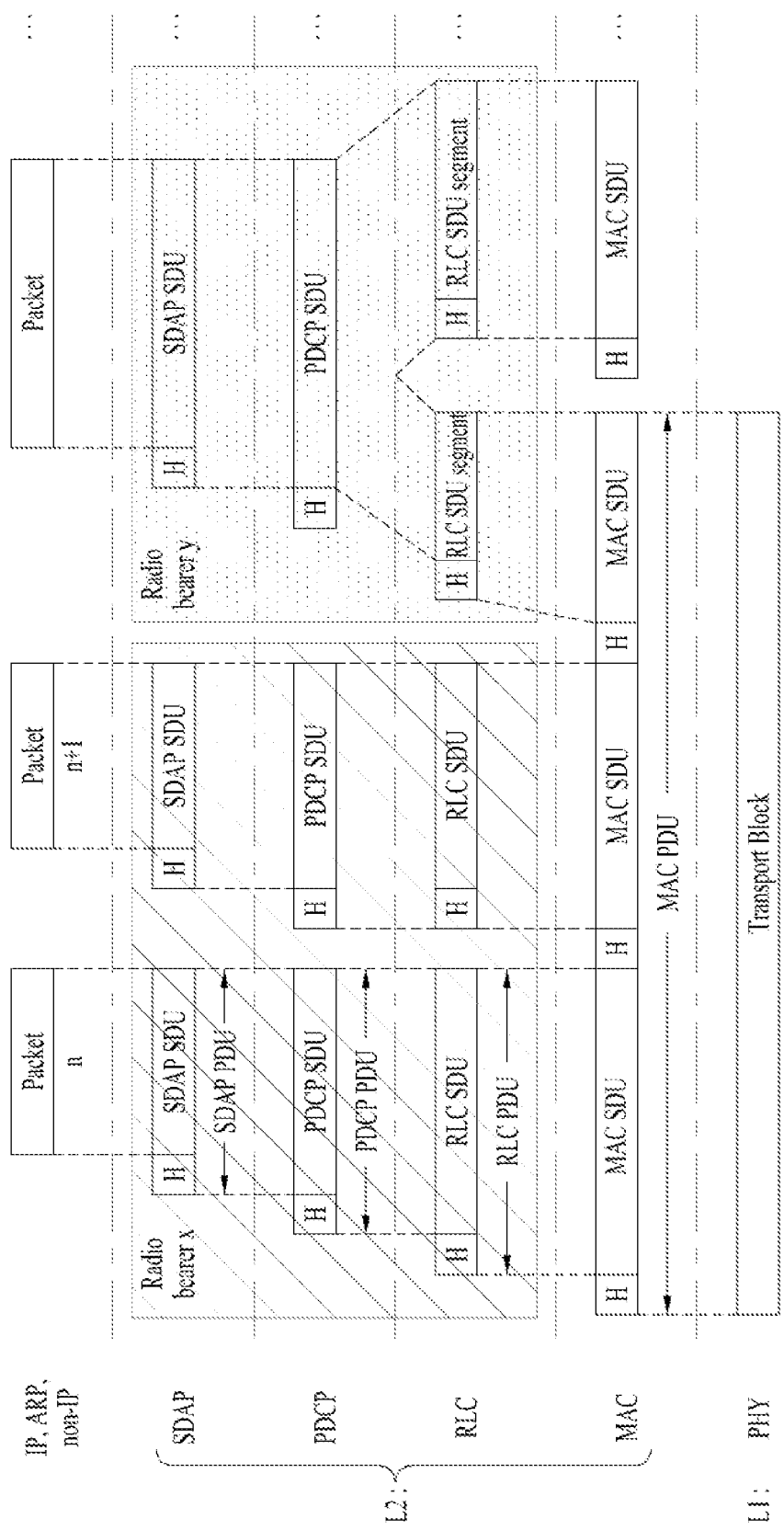
FIG. 6 illustrates a data flow example in the 3GPP new radio (NR) system.

FIG. 6 illustrates a data flow example in the 3GPP NR system.

In FIG. 6, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to physical uplink shared channel (PUSCH) and physical random access channel (PRACH), respectively, and the downlink transport channels DL-SCH, BCH and PCH are mapped to physical downlink shared channel (PDSCH), physical broad cast channel (PBCH) and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

If a UE is powered on or newly enters a cell, the UE performs an initial cell search procedure of acquiring time and frequency synchronization with the cell and detecting a physical cell identity $N^{cell}_{ID}$ of the cell. To this end, the UE may obtain (time and/or frequency) synchronization with a cell of the BS by receiving synchronization signals of the cell, e.g. a primary synchronization signal (PSS) and a secondary synchronization signal (SSS), from the BS and obtain information such as a cell identity (ID). The UE having finished initial cell search may perform the random access procedure to complete access to the BS. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed. After performing the procedure described above, the UE may perform PDCCH/PDSCH reception and PUSCH/PUCCH transmission as a typical procedure of transmission of an uplink/downlink signal.

The random access procedure is used for various purposes including initial access, adjustment of uplink synchronization, resource assignment, and handover. The random access procedure takes two distinct forms: a contention-based random access (CBRA) procedure and a contention-free random access (CFRA) procedure. The CFRA procedure is used for general operations including initial access, while the CFRA procedure is used for limited operations such as handover, random access triggered by PDCCH order, BFR, request for other SI and etc.

The CBRA procedure may include the following four steps. Messages/transmissions in Steps 1 to 4 given below may be referred to as Msg1 to Msg4, respectively.
1) Step 1: Random Access Preamble on RACH in uplink (Msg1 from UE to BS);
2) Step 2: Random Access Response on DL-SCH (Msg2 from BS to UE);
3) Step 3: First scheduled UL transmission on UL-SCH (Msg3 from UE to BS); and
4) Step 4: Contention Resolution on DL (Msg4 from BS to UE).

The CFRA procedure may include the following three steps.
1) Step 0: Random Access Preamble assignment (from BS to UE);
2) Step 1: Random Access Preamble on RACH in uplink (Msg1 from UE to BS); and
3) Step 2: Random Access Response on DL-SCH (Msg2 from BS to UE).

The random access procedure is initiated by a PDCCH order, by a MAC entity itself, or by RRC. There is only one random access procedure on-going at any point in time in a MAC entity. A random access procedure is triggered by various events. The events triggering the random access procedure may comprise: initial access from RRC_IDLE; RRC connection re-establishment; DL or UL data arrival during RRC_CONNECTED when UL synchronization status is "non-synchronized"; UL data arrival during RRC_CONNECTED when there is no PUCCH resources for scheduling request (SR) available; SR failure; request by RRC upon synchronization reconfiguration (e.g. handover); transition from RRC INACTIVE; to establish time alignment at SCell addition; request for other system information (SI), where the other SI encompasses all system information blocks (SIBs) not broadcast in the minimum SI required for initial access and information for acquiring any other SI; and/or beam failure recovery.

In NR, the beam failure detection (BFD) and the beam failure recovery (BFR) have been introduced considering a cell supporting multiple beams. For BFD, a BS configures a UE with BFD reference signals (synchronization signal block (SSB) or channel state information reference signal (CSI-RS)) and the UE detects beam failure when the number of beam failure instance indications from the physical layer reaches a configured threshold before a configured timer expires. After beam failure is detected, the UE triggers beam failure recovery by initiating a random access procedure on the PCell; and selects a suitable beam to perform beam failure recovery (if the BS has provided dedicated random access resources for certain beams, those will be prioritized by the UE). Upon completion of the random access (RA) procedure, beam failure recovery is considered complete.

Recently, the NR-U work item was approved by 3GPP. The NR-U work item covers five scenarios with functionalities such as carrier aggregation (within one BS), dual connectivity (across two BSs), LTE anchor in licensed spectrum, 5G NR anchor in licensed spectrum, uplink only in licensed spectrum, downlink only in unlicensed spectrum as well as stand-alone operation.

In NR, the RA and BFD/BFR procedures are mainly related to the multi-beam operation. If the unlicensed spectrum operates as a SpCell such as Pcell or PSCell, the UE in NR-U would have to perform the BFD/BFR and RA procedures.

Referring to the current NR standard document 3GPP TS 38.321, a UE may perfors the BFD and BFR procedure as follows. A MAC entity of the UE may be configured by RRC with a BFD procedure which is used for indicating to the serving BS of a new SSB or CSI-RS when beam failure is detected on the serving SSB(s)/CSI-RS(s). Beam failure is detected by counting beam failure instance (BFI) indication from the lower layers (e.g., PHY) to the MAC entity. The network (e.g. BS) provides a UE with the following parameters for the BFD and BFR procedure:
beamFailureInstanceMaxCount for the BFD, where beamFailureInstanceMaxCount determines after how many beam failure events the UE triggers BFR;
beamFailureDetectionTimer for the BFD;
beamFailureRecoveryTimer for the BFR procedure;
preambleTransMax: the maximum number of RAP transmissions for the BFR;
ra-ResponseWindow: the time window to monitor response(s) for the BFR using CFRA preamble;
prach-ConfigIndex: the available set of PRACH occasions for the transmission of the RAP for the BFR;
ra-ssb-OccasionMaskIndex: defines PRACH occasion(s) associated with an SSB in which the MAC entity may transmit an RAP for the BFR;
ra-OccasionList: defines PRACH occasion(s) associated with a CSI-RS in which the MAC entity may transmit an RAP for the BFR.

The following UE variables are used for the BFD procedure:
BFI_COUNTER: counter for beam failure instance (BFI) indication which is initially set to 0.

The MAC entity shall:
1> if BFI indication has been received from lower layers:
2>> start or restart the beamFailureDetectionTimer;
2>> increment BFI_COUNTER by 1;
2>> if BFI_COUNTER>=beamFailureInstanceMaxCount:
3>>> initiate an RA procedure (refer to section 5.1 of 3GPP TS 38.321) on the SpCell.
1> if the beamFailureDetectionTimer expires:
2>> set BFI_COUNTER to 0.
1> if the RA procedure is successfully completed (refer to section 5.1 of 3GPP TS 38.321):
2>> stop the beamFailureRecoveryTimer, if configured;
2>> consider the BFD procedure successfully completed.

Figure 7:
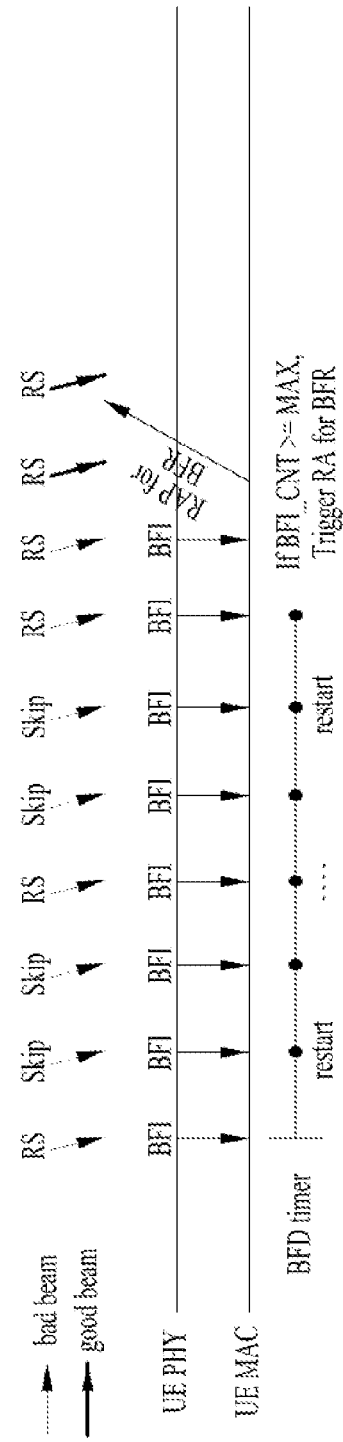
FIGS. 7 to 9 illustrate examples of BFD procedures in an unlicensed spectrum.
Figure 8:
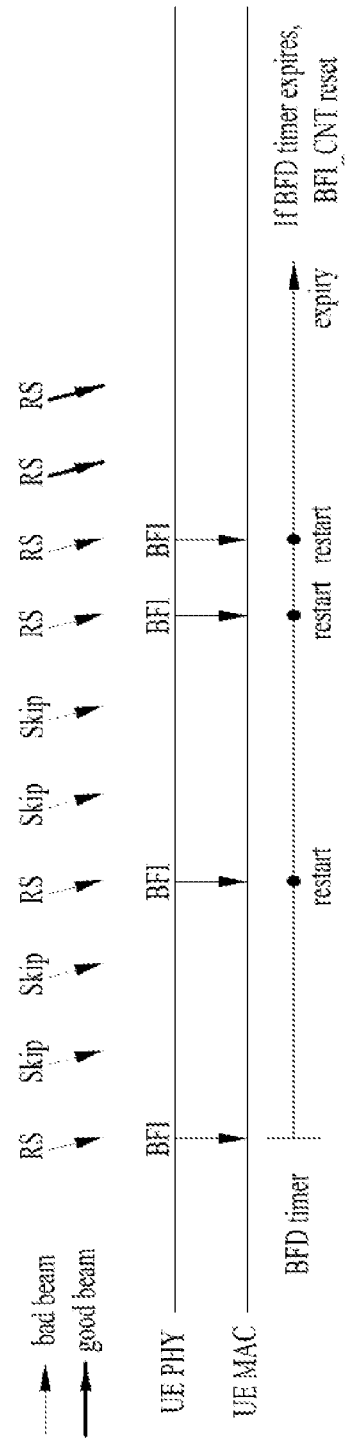
Figure 9:
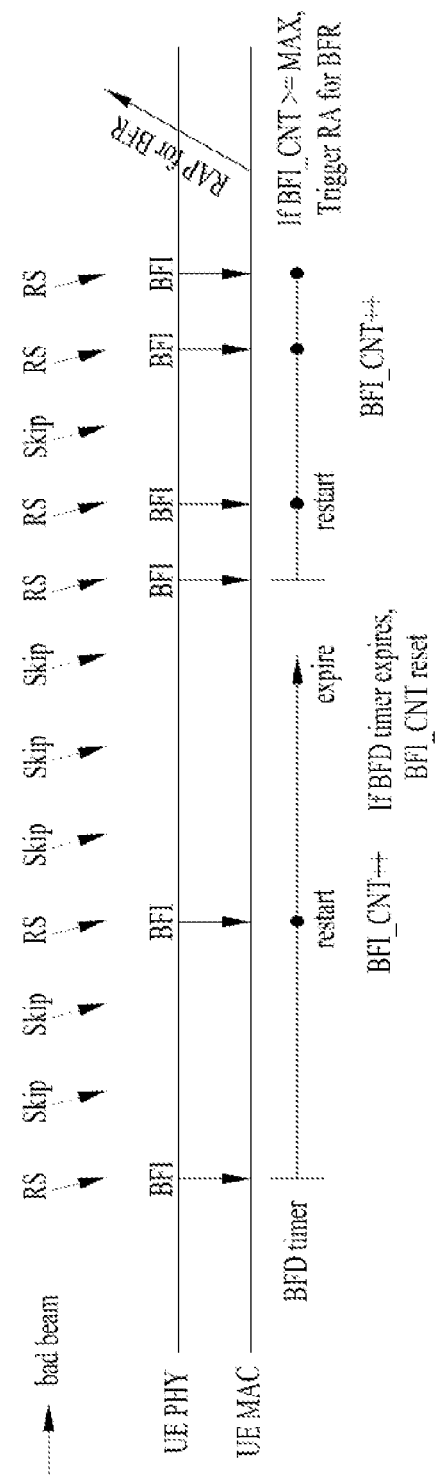

FIGS. 7 to 9 illustrate examples of BFD procedures in an unlicensed spectrum. In FIGS. 7 to 9, "BFD timer" denotes beamFailureDetectionTimer, "BFI_CNT" denotes BFI_COUNTER, "MAX" denotes beamFailureInstanceMaxCount, and "BFI_CNT++" denotes incrementing BFI_COUNTER by 1.

According to the current NR standard document, in order to trigger the BFR procedure, a UE performs a BFD procedure by using the BFI_COUNTER and beamFailureDetectionTimer. The UE increments the BFI_COUNTER by 1 when BFI is indicated from lower layer. Generally, the physical layer (PHY) of the UE checks its serving beam quality by measuring the reference signal (RS) periodically transmitted by the network. If the quality of the RS is bad, the physical layer (PHY) sends a BFI indication to the MAC layer (refer to 3GPP TS 38.133).

However, the BS may not transmit the DL RS in an unlicensed band due to listen before talk (LBT) failures. Since the UE does not know whether the BS skips transmitting the RS in a RS resource, the beam failure instance may be indicated from the lower layer (i.e. PHY) in a case where the BS skips transmitting the RS in the RS resource as well as in a case where the BS transmits the RS in the RS resource but the quality of RS is band, as shown in FIG. 7.

If the network skips transmitting the RS due to LBT failure and the UE cannot measure the serving beam quality, it may be desirable that the UE does not increment the BFI_COUNTER because incrementing the BFI_ COUNTER when the network skips transmitting the RS in a RS resource can lead to triggering inaccurate or unnecessary BFR. The unnecessary triggered BFR could result to increase the congestion level of the unlicensed band. If the beam quality could be improved sooner, it would be better that the BFR procedure is not performed as illustrated in FIG. 8.

Besides, referring to FIG. 9, if the network skips transmitting the RSs continuously due to LBT failure until the BFD timer expires, the BFR could not be triggered at the appropriate time, or the BFR may be triggered too late.

Figure 10:
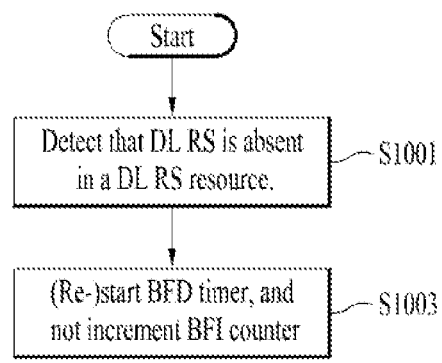
FIG. 10 illustrates an example of a flow diagram for BFD procedure according to implementations of the present disclosure.

FIG. 10 illustrates an example of a flow diagram for BFD procedure according to implementations of the present disclosure.

In order for a UE to trigger the BFR procedure only when the serving beam quality is really bad and in a timely manner, a new BFD procedure needs to be defined. In the BFD procedure of the present disclosure, a UE does not increment the BFI_COUNTER (S1001) but (re-)starts the beamFailureDetectionTimer when distinguishing or recognizing that a DL RS is absent in a DL RS resource (S1003). In other words, when the UE determines that the network skips or has skipped transmitting the DL RS in a DL RS resource configured in a cell, the UE of the present disclosure does not increment the BFI_COUNTER but (re-)starts the beamFailureDetectionTimer.

In the present disclosure, the DL RS for a beam may be a SSB or CSI-RS. The DL RS for a beam is configured by the network to be periodically transmitted. The transmission of DL RS for the serving beam may be skipped due to the LBT failure. When the DL RS for the serving beam is received and the measured beam quality is bad, the BFI indication is sent from lower layer (e.g., PHY) to the MAC. In the present disclosure, the UE may determine or recognize the occurrence of the event of 'skipped DL RS':
- when the received power/quality of the DL RS is lower than a threshold value; and/or
- when there is no indication of the existence of DL RS from a BS (e.g. no DCI triggering the DL RS); and/or
- when there is an indication of skipped DL RS or skipped DL resource including the DL RS from a BS.

In some scenarios of the present disclosure, a no beam instance (NBI) indication may be defined and used. The PHY of the UE may transmit a NBI indication to the MAC of the UE when a specific condition is met (e.g. when the beam quality on the RS resource(s) is worse than a threshold value). The MAC entity of the UE may determine that the network has not transmitted a RS in a DL RS resource (i.e. RS skip) when receiving a NBI indication from the lower layer (PHY).

In the present disclosure, the DL RS for a beam may be a SSB or CSI-RS. A UE may assesse the downlink link quality of a serving beam based on the DL RS for a beam in a set of RS resources in order to detect beam failure instance for a cell (e.g. SpCell operating in the unlicensed spectrum). The DL RS for a beam is configured by the network to be periodically transmitted. For example, the RS resources can be periodic CSI-RS resources and/or SSBs. On each RS resource (or a set of RS resources), the UE may estimate the radio link quality of a serving beam and compare it to one or more threshold values. The UE may determine/detect a beam failure instance or a RS skip instance, based on the radio link quality of the serving beam and the one or more thresholds. For example, the UE may determine that there is a beam failure instance when the radio link quality of a serving beam is worse than a first threshold value but not worse than a second threshold value, and determine that there is a no beam instance (i.e., RS skip instance) when the radio link quality of the serving beam is worse than the second threshold value.

In the view point of a UE, bad radio link quality of a serving beam may mean that the transmission of DL RS for the serving beam may be skipped due to the LBT failure or that the DL RS for the serving beam is received by the UE but the measured beam quality is bad. In an example of the present disclosure, when the DL RS for the serving beam is received and the measured beam quality is bad, the BFI indication is sent from lower layer (e.g., PHY) to the MAC. When transmission of DL RS is skipped, NBI indication is transmitted from the lower layer to the MAC entity.

Figure 11:
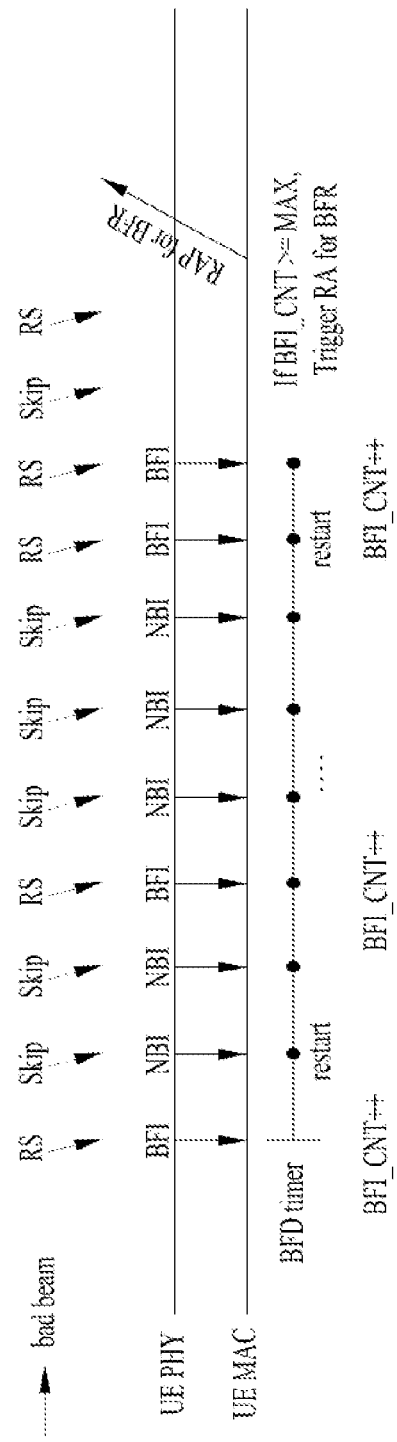
FIG. 11 illustrates an example of a BFD procedure according to an implementation of the present disclosure.

FIG. 11 illustrates an example of a BFD procedure according to an implementation of the present disclosure. In FIG. 11, "BFD timer" denotes beamFailureDetectionTimer e "BFI_CNT" denotes BFI_COUNTER, "MAX" denotes beamFailureInstanceMaxCount, and "BFI_CNT++" denotes incrementing BFI_COUNTER by 1.

For a UE, the BFD related parameters are configured by the network through RRC signaling. The BFD related parameters comprise beamFailureInstanceMaxCount (BFI MAX counter) and beamFailureDetectionTimer (BFD timer).

Referring to FIG. 11, the UE (re)starts the BFD timer if a BFI indication has been received from lower layer and increments BFI_COUNTER by 1. The UE restarts the BFD timer and does not increment BFI_COUNTER if a NBI indication has been received from lower layer while the BFD timer is running. If BFI_COUNTER>=beamFailureInstanceMaxCount, the UE initiates a RA procedure for BFR. If the beamFailureDetectionTimer expires, the UE set BFI_COUNTER to 0.

In some scenarios of the present disclosure, a new counter is defined for counting the RS skip. Hereinafter, the new counter is referred to as NBI_COUNTER. If NBI_ COUNTER reaches a maximum value, the UE triggers a BFR or RA procedure. Or, if NBI_COUNTER reaches a maximum value and the UE has an available UL resource, the UE transmits information indicating that its RSs are continuously skipped to the network.

Figure 12:
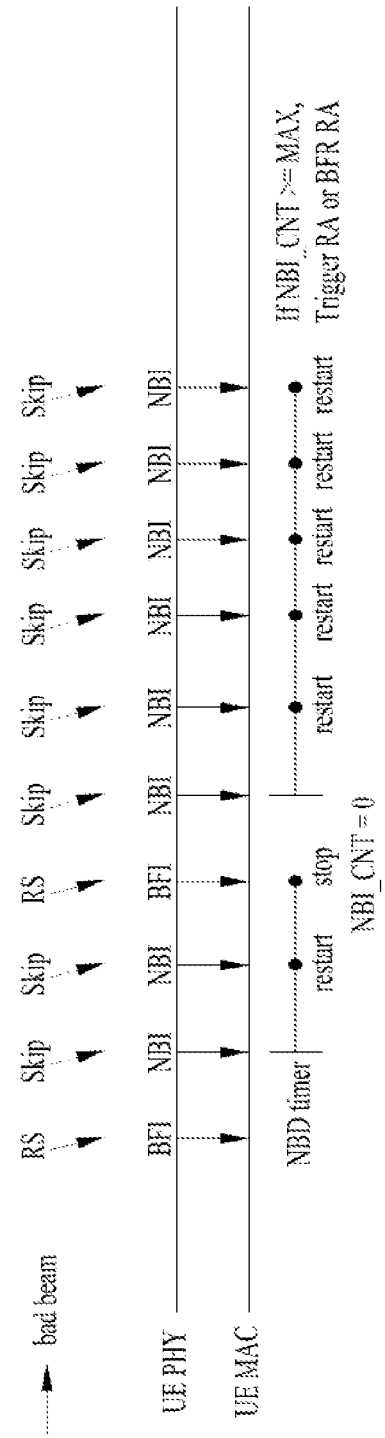
FIG. 12 illustrates another example of a BFD procedure according to an implementation of the present disclosure.

FIG. 12 illustrates another example of a BFD procedure according to an implementation of the present disclosure. In FIG. 12, "NBD timer" denotes noBeamDetectionTimer, and "NBI CNT" denotes NBI_COUNTER, "MAX" denotes noBeamInstanceMaxCount.

For a UE, the BFD related parameters are configured by RRC signaling. In an implementation of the present disclosure, the BFD related parameters may comprise: beamFailureInstanceMaxCount (BFI MAX counter), beamFailureDetectionTimer (BFD timer), noBeamInstanceMaxCount (NBI MAX counter), and noBeamDetectionTimer (NBD timer).

Referring to FIG. 12, the UE (or MAC entity of the UE) (re)starts the NBD timer if the NBI indication has been received from lower layer (e.g. PHY), and increments NBI_COUNTER by 1. The UE (re)starts the BFD timer if the BFI indication has been received from the lower layer and increments BFI_COUNTER by 1. If the BFI indication has been received from the lower layer while the NBD timer is running, the UE may reset NBI_COUNTER. Resetting NBI_COUNTER when detecting a BFI means that continuously detected NBIs are valid for triggering the BFR or RA procedure. In other words, the continuously received NBIs are valid in a MAC entity of the UE for triggering the BFR or RA procedure.

In some scenarios of the present disclosure, an indication (e.g., beam measurement indication (BMI)) may be defined and used for a UE to trigger the BFR procedure only when detecting NBIs consecutively. When the DL RS for the serving beam is received and the beam quality is good, a BMI may be transmitted from the lower layer (e.g. PHY) to the MAC entity. If the BMI has been received from the lower layer while the NBD timer is running, and the MAC entity of the UE may reset NBI_COUNTER.

If BFI_COUNTER>=beamFailureInstanceMaxCount, the UE initiates a RA procedure for BFR. If NBI_COUNTER>=noBeamInstanceMaxCount, the UE initiates a RA procedure for BFR or a normal RA procedure.

NBI_COUNTER is used for triggering the BFR or RA procedure when the DL RSs for the serving beam are consecutively skipped for a certain time. Since skipping transmitting a DL RS for a serving beam in an unlicensed band means that the channel/frequency/BWP/carrier in the unlicensed band is busy, the BFR or RA procedure triggered/initiated based on NBI_COUNTER may be performed on the different channel/frequency/BWP/carrier. Accordingly, the UE may switch to different channel/frequency/BWP/carrier to perform the initiated RA procedure.

If the BFD timer expires, the UE sets BFI_COUNTER to 0. If the NBD timer expires, the UE set NBI_COUNTER to 0.

According to the implementations of the present disclosure, the BFR procedure can be initiated only when the serving beam quality is really bad and in a timely manner.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:

1. A method for performing a beam management by a user equipment (UE) in a wireless communication system, the method comprising:
   starting a beam failure detection (BFD) timer;
   incrementing a beam failure instance (BFI) counter by 1; and
   detecting an absence of a downlink reference signal (DL RS) in a DL RS resource;
   restarting the BFD timer without incrementing the BFI counter, when detecting absence of the DL RS.

2. The method according to claim 1, further comprising:
   performing a beam failure recovery (BFR) procedure when the BFI counter reaches a first maximum value.

3. The method according to claim 1,
   wherein the UE resets the BFI counter to 0 when the BFD timer expires.

4. The method according to claim 1, further comprising:
   incrementing a no beam instance (NBI) counter by 1, when detecting absence of the DL RS.

5. The method according to claim 4, further comprising:
   resetting the NBI counter to 0, when incrementing the BFI counter.

6. The method according to claim 4, further comprising:
   starting or restarting a no beam detection (NBD) timer, when detecting absence of the DL RS.

7. The method according to claim 6, further comprising:
   resetting the NBI counter to 0 when the NBD timer expires.

8. The method according to claim 6,
   wherein the NBI counter is incremented while the NBD timer is running.

9. The method according to claim 4, further comprising:
   performing a random access procedure when the NBI counter reaches a second maximum value.

10. The method according to claim 4, further comprising:
    transmitting, to a base station, information indicating that the DL RS for the UE is continuously absent, when the NBI counter reaches a second maximum value and when the UE has an available UL resource.

11. A device for a user equipment of performing a beam management in a wireless communication system, the device comprising:
    at least one processor; and
    at least one computer memory that is operably connectable to the at least one processor and that has stored thereon instructions which, when executed, cause the at least one processor to perform operations comprising:
    starting a beam failure detection (BFD) timer;
    incrementing a beam failure instance (BFI) counter by 1; and
    detecting an absence of a downlink reference signal (DL RS) in a DL RS resource;
   restarting the BFD timer without incrementing the BFI counter, when detecting absence of the DL RS.

12. The device according to claim 11,
    wherein the operations further comprise:
    performing a beam failure recovery (BFR) procedure when the BFI counter reaches a first maximum value.

13. The device according to claim 11,
wherein the operations further comprise:
resetting the BFI counter to 0 when the BFD timer expires.

14. The device according to claim 11,
wherein the operations further comprise:
incrementing a no beam instance (NBI) counter by 1, when detecting absence of the DL RS.

15. The device according to claim 14,
wherein the operations further comprise:
resetting the NBI counter to 0, when incrementing the BFI counter.

16. The device according to claim 14,
wherein the operations further comprise:
starting or restarting a no beam detection (NBD) timer, when detecting absence of the DL RS.

17. The device according to claim 16,
wherein the operations further comprise:
resetting the NBI counter to 0 when the NBD timer expires.

18. The device according to claim 16,
wherein the NBI counter is incremented while the NBD timer is running.

19. The device according to claim 14,
wherein the operations further comprise:
performing a random access procedure when the NBI counter reaches a second maximum value.

20. The device according to claim 11,
wherein the UE is an autonomous vehicle that communicates with at least a mobile terminal, a network, and another autonomous vehicle other than the UE.

* * * * *